United States Patent Office.

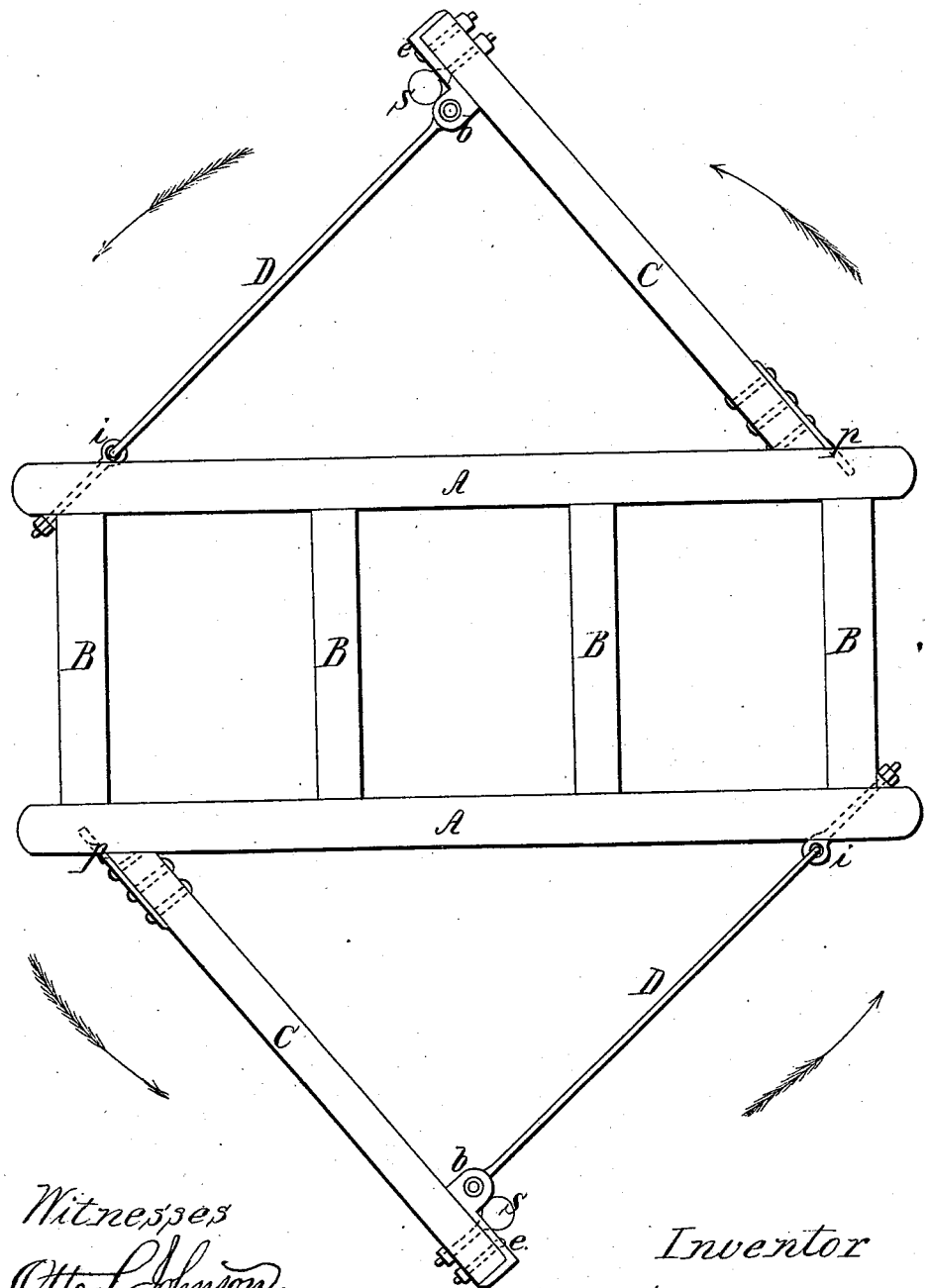

WILLIAM H. BUELL, OF UNION CITY, MICHIGAN.

Letters Patent No. 82,688, dated October 6, 1868.

---

IMPROVED MODE OF SECURING HORSE-POWERS TO THE GROUND.

---

The Schedule referred to in these Letters Patent and making part of the same.

---

TO ALL WHOM IT MAY CONCERN:

Be it known that I, WILLIAM H. BUELL, of Union City, in the county of Branch, and State of Michigan, have invented a new and useful Improvement in "Fasteners" for Portable Horse-Powers; and I do hereby declare that the following is a full, clear, and exact description of the construction and operation of the same, reference being had to the annexed drawing, which gives a plan view of an ordinary horse-power frame, and my fastening-arrangements connected thereto.

My invention applies to that class of horse-powers in which the horses are hitched to the ends of sweeps, and travel in a circular path, and is designed to partially counteract the effect of the torsional strain upon the frame, produced by the leverage of the sweeps; and the better to enable others skilled in this branch of mechanism to construct and use my said invention, I will now proceed to describe the same.

A represents the sides and B the girts of an ordinary horse-power frame, and C and D exhibit respectively stays and rods set off in pairs, as seen, from each side of said frame, so as to form the two lines of a triangle, the third line being the side A.

I usually construct the stays C of pieces of wooden scantling, the end that abuts against the frame being cut to the proper bevel, and furnished with an iron steady-pin, $p$, which enters a hole bored in the frame at a corresponding angle, to keep that end of the stay steady and firm in place. This pin may be formed on a strap to be securely bolted to the side of the stay, as shown, or the pin may be driven into a hole in its end; but in such case the end should be provided with a band to prevent splitting.

The outer end of each stay is furnished with what I term a hinge-shoe stop, seen at $e$, which can be made of wrought, malleable, or common cast iron, and consists of a strap bent round the end of the stay, to better resist longitudinal pressure, and of a pair of ears, $b$, projecting sufficiently far to form a sufficient angle or corner, within which the fastening-stake S may be placed, when it is driven into the ground.

The outer ends of the rods D are jointed by a stout pivot-bolt to the shoe-stop through its ears, and their inner ends hook into eye-bolts $i$, which I usually insert in the frame, so that they may be secured by a nut and washer in the interior angle formed by the outer girts, as may be clearly seen in the drawing.

In the ordinary way of fastening horse-powers to the ground, by driving the stakes in contact with the frame, great difficulty is always felt, not only in preventing the frame from twisting round, but from lifting up, by reason of the narrowness of the said frame, and the comparative small area enclosed between the stakes, which, in loose, friable soils, must be numerous.

By the use of my fastening-connections, only two stakes are needed, for the stays and rods being tangential to a circle, the diameter of which equals the length of the frame, and the stakes placed at the apex of the angles, the practical effect is to make the frame as broad as it is long, thereby neutralizing the tendency to lift, and reducing the leverage-power of the sweeps. The stakes being at a distance from the frame, can be readily and safely driven, and the time consumed in placing the steady-pins in the holes, and hooking the rod to the eye-bolts, is so short as to be almost immaterial. Of course the parts can be detached, by a reverse operation, with the same facility, and the rod and stay being hinged or linked together, can be folded close, and easily carried with the power from one place to another.

When the fastening-devices are to be applied to an iron frame, such modifications (as will readily be suggested by the necessity of each particular case) in the manner of connecting with the said frame, must necessarily be made; neither do I regard it indispensable that the hinge-shoe stop which is bolted to the end of the stay, should be constructed precisely in the manner as hereinbefore described, for a bent iron strap, with a hooked projection, to which the rod may be linked, and serve as an abutment for the stake, will answer substantially the same purpose. In the relative arrangement of the stays and rods, as shown, the horses are supposed to move in the direction of the arrow, as is usually the case, and should the direction of motion be changed, a corresponding change of arrangement will, of course, be required.

I do not claim, irrespectively, fastening horse-powers to the ground by rods or bars projecting from their frames; but What I do claim, and desire to secure by Letters Patent is as follows:

I claim, in combination with each other, and with a horse-power frame, the stays C, rods D, and stakes S, when said parts are arranged relatively with each other, and with said frame, and constructed and connected substantially as and for the purpose specified.

WILLIAM H. BUELL.

Witnesses:
OTTO L. JOHNSON,
C. T. COOK.